Figure 1:
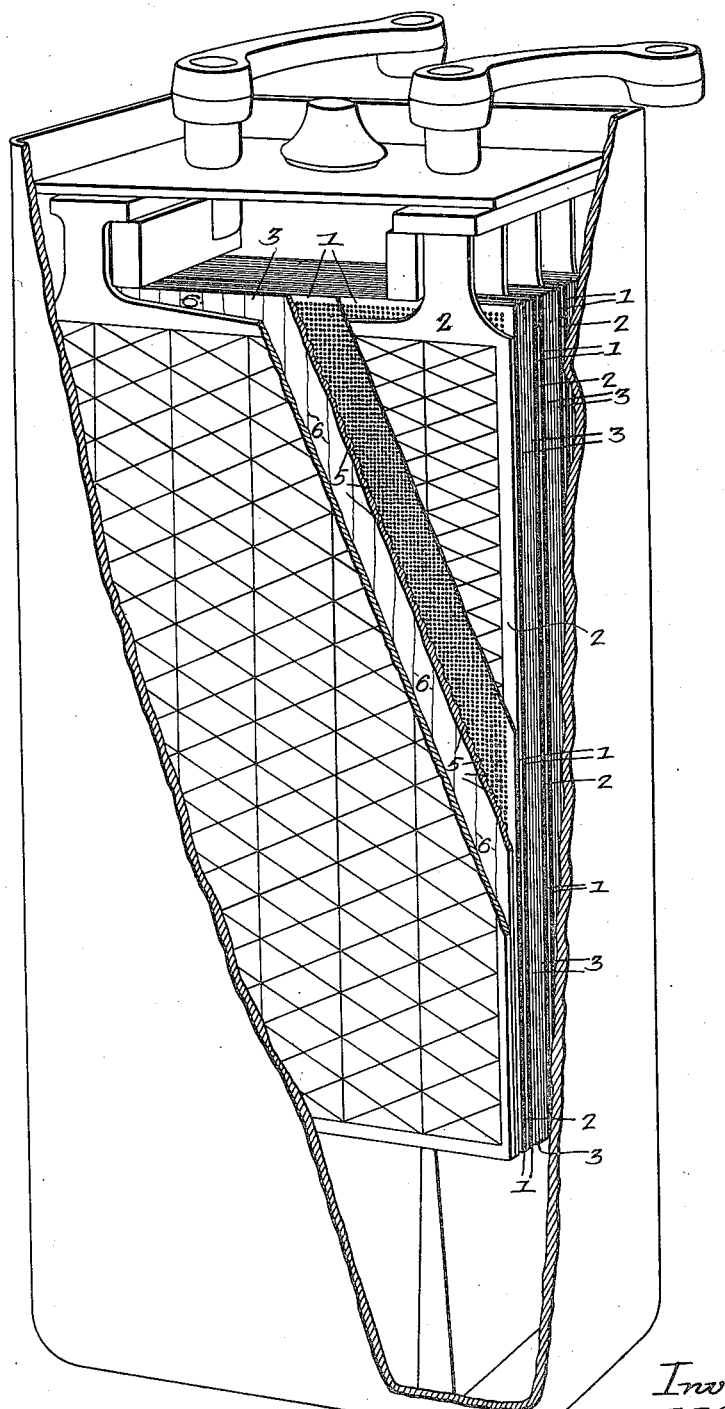

J. M. SKINNER.
RETAINER FOR ACTIVE MATERIAL OF STORAGE BATTERY ELECTRODES.
APPLICATION FILED APR. 19, 1917.

1,272,868.

Patented July 16, 1918.
2 SHEETS—SHEET 1.

Inventor—
James M. Skinner
by his Attorneys—
Howson & Howson

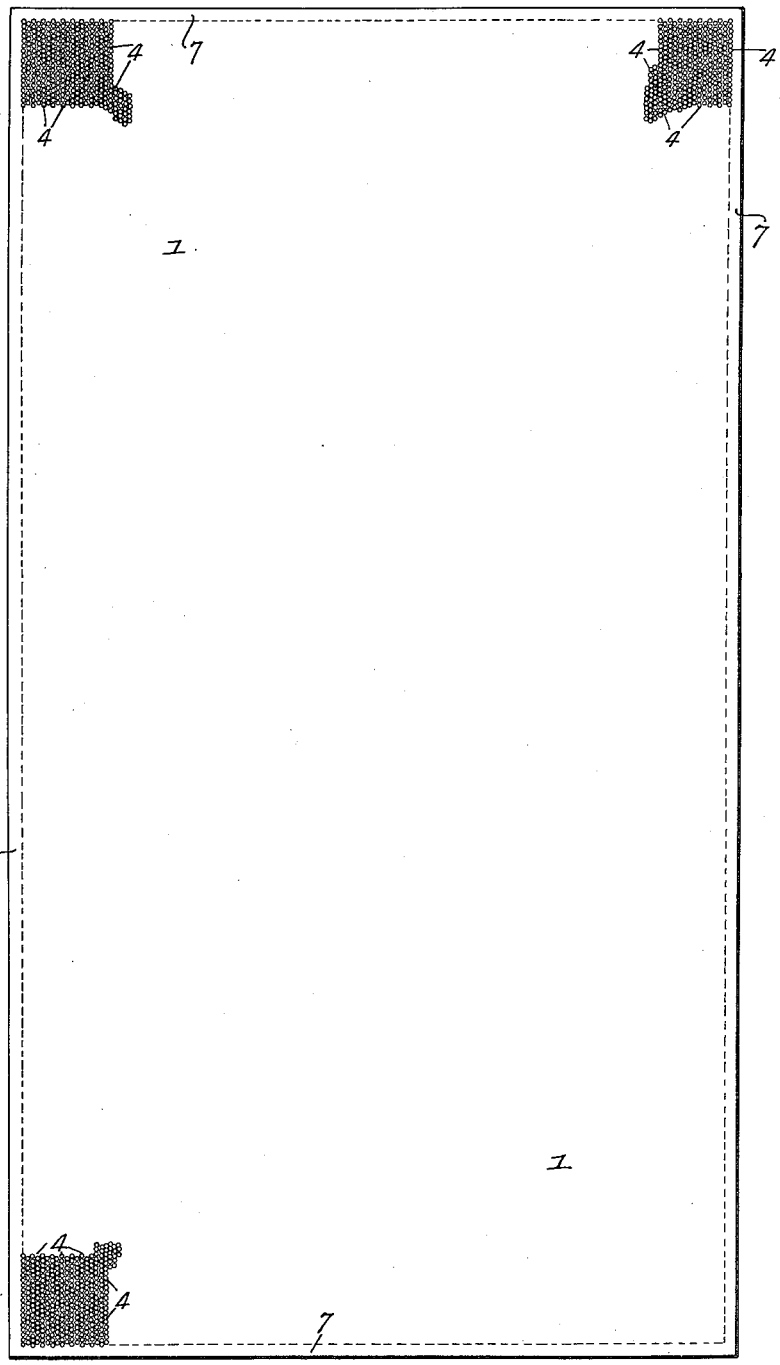

UNITED STATES PATENT OFFICE.

JAMES M. SKINNER, OF PHILADELPHIA, PENNSYLVANIA, ASSIGNOR TO PHILADELPHIA STORAGE BATTERY COMPANY, OF PHILADELPHIA, PENNSYLVANIA, A CORPORATION OF PENNSYLVANIA.

RETAINER FOR ACTIVE MATERIAL OF STORAGE-BATTERY ELECTRODES.

1,272,868.

Specification of Letters Patent.  Patented July 16, 1918.

Application filed April 19, 1917.  Serial No. 163,120.

*To all whom it may concern:*

Be it known that I, JAMES M. SKINNER, a citizen of the United States, residing in Philadelphia, Pennsylvania, have invented Retainers for Active Material of Storage-Battery Electrodes, of which the following is a specification.

One object of my invention is to provide a retainer of such construction and proportions as will cause a material increase in the life of the positive plates of the battery in which it is employed without endangering their capacity;—the invention contemplating more particularly an improved rubber sheet retainer.

I further desire to provide a storage battery in which the insulating sheets adjacent the positive electrodes shall be structurally strong and of such construction as will prevent the rapid loss of loosened or disintegrated active material from the positive plates and in which the perforations in such retainer sheet shall be of such size that they will not tend to become clogged by separated and sulfated active material which has lost contact with the body of the plate or become disintegrated.

These objects and other advantageous ends I secure as hereinafter set forth, reference being had to the accompanying drawings, in which:

Figure 1 is a perspective view of a storage battery cell employing retainers constructed according to my invention; and Fig. 2 is an elevation of my retainer, showing its perforations as of an exaggerated size.

As is understood by those skilled in the art, it is customary in a storage battery cell of a certain well known type to interpose between the negative and positive electrode a wooden separator formed with parallel, vertically extending ribs projecting from that face adjacent the positive electrode. Between the surface of this electrode and the ribs of the wooden separator is placed a second separator, in the form of a relatively thin perforated sheet, usually of rubber or similar acid resisting material.

As ordinarily made, the perforations or openings in this rubber separator are of such dimensions that the loosened active material of the positive electrode, can and as a matter of fact, does rapidly pass through them.

As a result of much experiment I have discovered that if the perforations in the rubber separator be made of a diameter not exceeding one-fiftieth of an inch, the above noted objectionable action is very effectually prevented, it being noted that while these perforations are preferably circular, they may be polygonal in outline so long as they conform to the same general dimensions. I consider the above noted dimension of the holes in the rubber separator which is then properly considered a retainer, an important part of my invention, since holes having a width substantially greater than one-fiftieth of an inch, permit the passage of particles or disintegrated masses of active material from the positive electrode at such a rate that in a comparatively short time the capacity of the latter is reduced so far as to require its removal.

On the other hand, I have found that perforations of one-fiftieth of an inch or less, even when provided in such numbers as to expose a large area of the positive electrode, say twenty-five per cent, to the direct action of the electrolyte, effectually prevent the rapid loss of disintegrated and loosened particles of active material. This condition I believe to be due to the fact that the active material on the positive electrode tends to separate or break away in particles or masses whose greatest dimension is more than one-fiftieth of an inch.

While perforations of a diameter approximately one-fiftieth of an inch are fine enough to prevent the rapid loss of loosened active material, such material as does pass through, passes through readily without tending to clog the holes and thereby increasing the internal resistance and lowering the efficiency of the cell. I have found that the life of the battery electrodes equipped with rubber retainers made with perforations less than one-fiftieth of an inch in diameter, is from twenty-five to fifty per cent. greater than that of electrodes of a similar battery equipped with rubber separators of the ordinary construction.

In the above drawings, 1 represents a relatively thin sheet of rubber constituting the retainer which is to be interposed between each face of the positive battery electrode 2 and the adjacent wooden separator 3 and which is provided with circular perforations 4 whose diameter is substantially one-fiftieth of an inch or nearly the same as the thickness of the sheet itself. The ribs 5 of the wooden separator abut upon the rubber retainer 1 and it is to be noted that this is preferably of the construction described and claimed in my Patent #1,190,025 dated July 4, 1916, i. e., it is made of coniferous wood in which the relatively non-conducting or resinous layers 6 extend substantially at right angles to its general plane. As a result of this arrangement, the danger of short circuiting is reduced to a minimum, and maximum life is obtained.

While in the foregoing description I have referred to the perforated retainer and separator as made of rubber, it is to be understood that the actual composition of this member is immaterial, since it is merely necessary that it be a sufficiently good insulator which is not attacked by the electrolyte or active material and is of such a nature structurally as to properly fulfil its functions.

It is noted that the perforated retainer is preferably made with an unperforated marginal portion 7 at the sides and bottom in order to strengthen it against tearing and protect against short circuiting around its edges. Moreover by employing a retainer formed with minute circular perforations distributed or disposed uniformly over its surface, the finished product is structurally very strong and has no predisposition to split.

My retainer furthermore possesses so many perforations as close together that its porosity is very uniform, the acid being allowed to diffuse equally to all parts of the electrode on discharge, while the high gravity acid generated within the plate on charge is allowed to diffuse readily into the body of the cell, thus maintaining a high voltage during discharge and minimizing the effect of the high gravity acid generated within the electrode during charge.

Further, by the construction described, there is no possibility of the individual holes or perforations becoming larger or smaller by reason of the lateral or other displacement of parts of the retainer. The retainer will permanently maintain its initial uniform porosity, which is an important consideration under conditions of prolonged use.

Further, my retainer effectually protects the wood separators, which tend to be attacked by the active material, so that it is practically never necessary to renew the wood separators during the life of the battery.

It is of course desirable to assemble the electrodes in their jar or container so tightly as to cause the rubber sheets to lie sufficiently close to the positive electrodes to perform their function as retainers.

I claim:—

1. As a new article of manufacture a retainer consisting of a relatively thin sheet of insulating material having perforations substantially one-fiftieth of an inch in diameter.

2. As a new article of manufacture a storage battery retainer consisting of a sheet of insulating material substantially one-sixty-fourth of an inch in thickness and having circular perforations substantially one-fiftieth of an inch in diameter.

3. The combination in a storage battery of a positive electrode; a wooden separator having ribs extending toward said electrode to form vertical channels for electrolyte; and a perforated sheet of insulating material between the ribs and the electrode, the perforations of said sheet being substantially one-fiftieth of an inch in diameter.

4. As a new article of manufacture a relatively thin sheet of insulating material having its main portion provided with minute approximately circular perforations and formed with an imperforate margin extending completely around it.

5. As a new article of manufacture a relatively thin sheet of insulating material having a body portion provided with minute approximately circular perforations and provided with imperforate side margins.

In witness whereof I affix my signature.

JAMES M. SKINNER.